(12) United States Patent
Ishizu et al.

(10) Patent No.: US 12,060,932 B2
(45) Date of Patent: Aug. 13, 2024

(54) OPERATION DEVICE FOR VEHICLE TRANSMISSION AND VEHICLE

(71) Applicant: ATSUMITEC CO., LTD., Shizuoka (JP)

(72) Inventors: Harumichi Ishizu, Shizuoka (JP); Kensuke Suzuki, Shizuoka (JP); Masaki Kanatori, Shizuoka (JP)

(73) Assignee: ATSUMITEC CO., LTD., Shizuoka (JP)

( * ) Notice: Subject to any disclaimer, the term of this patent is extended or adjusted under 35 U.S.C. 154(b) by 9 days.

(21) Appl. No.: 17/995,016

(22) PCT Filed: Mar. 30, 2021

(86) PCT No.: PCT/JP2021/013708
§ 371 (c)(1),
(2) Date: Sep. 29, 2022

(87) PCT Pub. No.: WO2021/201045
PCT Pub. Date: Oct. 7, 2021

(65) Prior Publication Data
US 2023/0213094 A1    Jul. 6, 2023

(30) Foreign Application Priority Data

Apr. 1, 2020  (JP) .................. 2020-065986

(51) Int. Cl.
*F16H 59/10* (2006.01)
*F16H 61/02* (2006.01)
*F16H 61/24* (2006.01)

(52) U.S. Cl.
CPC ......... *F16H 59/10* (2013.01); *F16H 61/0204* (2013.01); *F16H 61/24* (2013.01); *F16H 2061/247* (2013.01)

(58) Field of Classification Search
CPC ..... B60K 17/04; F16H 59/10; F16H 61/0204; F16H 61/24; F16H 2061/247
(Continued)

(56) References Cited

U.S. PATENT DOCUMENTS

2005/0217403 A1    10/2005  Suzuki et al.

FOREIGN PATENT DOCUMENTS

| DE | 4305015 C1 | * | 3/1994 | ............ B60K 20/04 |
| DE | 102010030808 A1 | * | 12/2011 | ............ F16H 59/10 |

(Continued)

OTHER PUBLICATIONS

International Search Report and Written Opinion dated May 11, 2021, for PCT Application No. PCT/JP2021/013708.

*Primary Examiner* — T. Scott Fix
(74) *Attorney, Agent, or Firm* — Kinney & Lange, P.A.

(57) ABSTRACT

An operation device for a vehicle transmission is configured to include: a base bracket that is fixed to a vehicle body of a vehicle; a slider lever that is slidably supported by the base bracket and includes a shift knob; and a main gear, which is rotatably supported by the base bracket and includes gear teeth at an outer circumferential portion, to which an end portion of a shift wire of the vehicle transmission is connected at a position separated from a gear support shaft of the base bracket, the slider lever including a rack gear that is formed along a sliding direction of the slider lever and is engaged with the gear teeth of the main gear, and gear change of the transmission being performed by causing the main gear to rotate with sliding of the slider lever and pushing and pulling the shift wire.

4 Claims, 11 Drawing Sheets

(58) Field of Classification Search
USPC .............................. 74/473.14, 473.15, 473.3
See application file for complete search history.

(56) References Cited

FOREIGN PATENT DOCUMENTS

| EP | 1580460 | A2 | * | 9/2005 | ............. F16H 59/10 |
|----|---------|----|---|--------|-----------|
| JP | S6258227 | U | | 4/1987 | |
| JP | H10286007 | A | * | 10/1998 | |
| JP | 2003285663 | A | | 10/2003 | |
| JP | 2005271789 | A | | 10/2005 | |
| JP | 2006044374 | A | | 2/2006 | |
| KR | 20100043947 | A | | 4/2010 | |

\* cited by examiner

FIG. 5
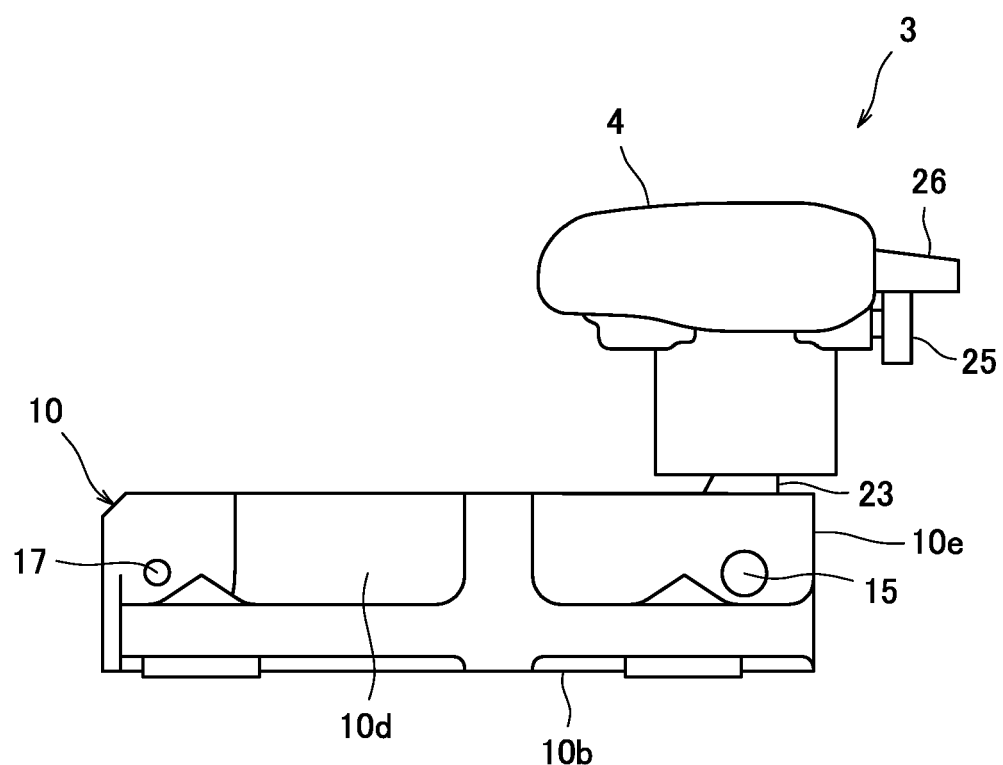
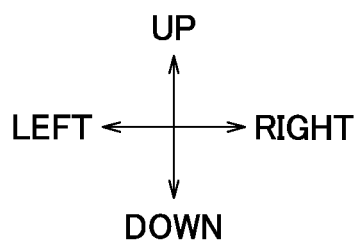

FIG. 11
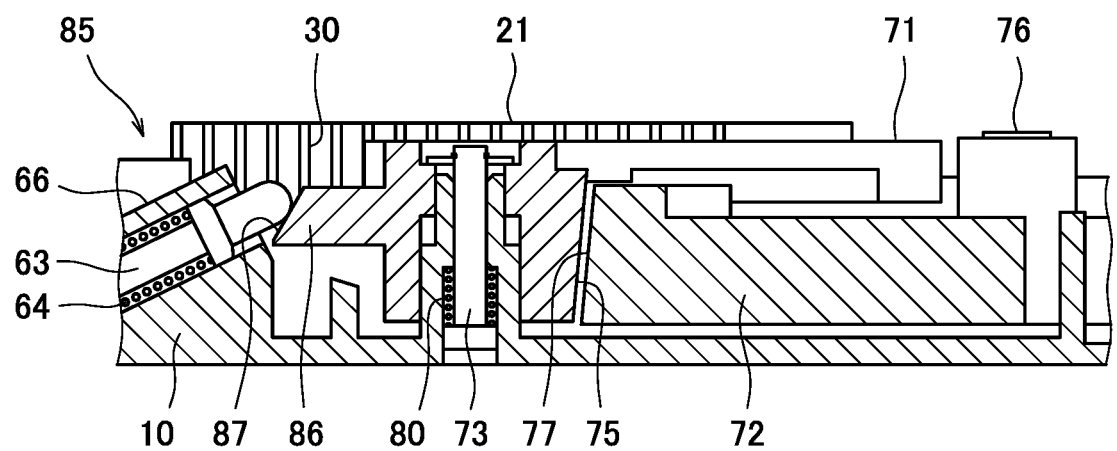
A-A SECTION
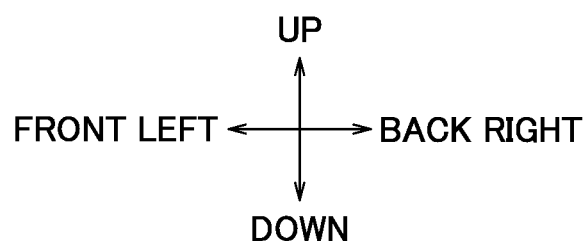

OPERATION DEVICE FOR VEHICLE TRANSMISSION AND VEHICLE

CROSS-REFERENCE TO RELATED APPLICATION(S)

This application is the national phase of PCT Application No. PCT/JP2021/013708 filed on Mar. 30, 2021, which claims priority to Japanese Application No. 2020-065986 filed on Apr. 1, 2020, the contents of which are incorporated herein by reference in their entirety.

BACKGROUND

Technical Field

The present disclosure relates to a structure of an operation device for a vehicle automatic transmission.

Background Art

A vehicle including an automatic transmission includes an operation device for operating a gear position. The operation device for the vehicle transmission includes a shift lever (shift knob) adapted to be operated by a driver and is configured to be able to select an arbitrary shift position such as parking (P), reverse (R), neutral (N), or drive (D) by moving the shift lever to the shift position.

As an operation device for a vehicle automatic transmission, an operation device with a configuration in which a lower end portion of a shift lever is rotatably supported by a support bracket fixed to a vehicle body as described in Patent Document 1 is known. The operation device in Patent Document 1 includes a link member that is rotatably supported by a support bracket below a shift lever and has a structure in which a lower end portion of the shift lever and the link member are gear-connected and a shift wire is connected to the link member.

Also, an operation device with a structure in which a shift knob has a slidable structure and a shift wire connected to the shift knob is directly pulled as described in Patent Document 2 is also known.

PRIOR ART DOCUMENT

Patent Document

Patent Document 1: Japanese Patent Laid-Open No. 2005-271789
Patent Document 2: Japanese Utility Model Laid-Open No. 62-58227

SUMMARY

In the related art, downsizing of operation devices for vehicle transmissions has been desired. In recent years, in particular, thin-type operation devices as in Patent Document 2 have been strongly required in order to reduce internal spaces at mounting locations. However, since the operation device in Patent Document 2 has a structure in which the shift wire for gear change is pushed and pulled by the shift knob, and the moving distance of the shift knob directly becomes the moving distance of the shift wire, it is difficult to arbitrarily set the moving distance and the operation force of the shift knob according to the structure.

Also, the shift knob may receive a force in all directions from a driver or the like, a support portion is thus required to have a structure with high rigidity, and this may lead to a problem of increases in weight and cost.

The present disclosure was made in view of such circumstances, and an object thereof is to provide an operation device for a vehicle transmission with a compact and highly rigid structure that allows arbitrary setting of a moving distance and an operation force of a shift knob and a vehicle including the operation device.

In order to achieve the above object, there is provided an operation device for a vehicle transmission according to the present disclosure including: a bracket that is fixed to a vehicle body of a vehicle; a sliding portion that is slidably supported by the bracket and includes a shift knob; and a gear, which is rotatably supported by the bracket and includes a tooth surface at an outer circumferential portion, to which a shift wire of the vehicle transmission is connected at a position separated from a position where the gear is supported by the bracket, the sliding portion including a rack gear that is formed along a sliding direction of the sliding portion and is engaged with the tooth surface of the gear, and gear change of the transmission being performed via the shift wire by causing the gear to rotate with sliding of the sliding portion.

Also, there is provided an operation device for a vehicle transmission according to the present disclosure including: a bracket that is fixed to a vehicle body of a vehicle; a sliding portion that is slidably supported by the bracket and includes a shift knob; a first gear that is rotatably supported by the bracket, includes a first tooth surface at an outer circumferential portion, and includes a second tooth surface at a position that is different from a position of the first tooth surface in a radial direction; and a second gear, which is rotatably supported by the bracket and includes a third tooth surface that is engaged with the second tooth surface, to which a shift wire of the vehicle transmission is connected at a position separated from a position where the second gear is supported by the bracket, the sliding portion including a rack gear that is formed along a sliding direction of the sliding portion and is engaged with the first tooth surface of the first gear, and gear change of the transmission being performed via the shift wire by causing the first gear and the second gear to rotate with sliding of the sliding portion.

There is provided a vehicle including: any of the aforementioned operation devices for a vehicle transmission.

According to the present disclosure, the sliding portion is slidably supported by the bracket, and it is thus possible to cause the support structure for the sliding portion to have relatively high strength. Also, since the sliding portion and the gear (or the first gear and the second gear) are separate structures, a structure in which a large force is unlikely to act on the gear even if a driver or the like of the vehicle applies a force to the shift knob is achieved. It is thus possible to achieve a thin thickness while reducing the strength of the gear. In this manner, it is possible to achieve downsizing while sufficiently securing the strength of the operation device.

BRIEF DESCRIPTION OF THE DRAWINGS

FIG. 5 is a back view of the operation device according to the first embodiment.

FIG. 11 is a vertical sectional view near a gear support shaft of a first gear in the operation device according to the third embodiment.

DETAILED DESCRIPTION

Hereinafter, embodiments of the present disclosure will be described in detail with reference to the drawings. Note that the following description will be given on the assumption that vehicle front, back, left, and right directions in a case in which an operation device 3 is mounted on a substantially horizontal surface of a center console 2 of a vehicle 1 are front, back, left, and right directions of the operation device 3.

First, a first embodiment of the present disclosure will be described using FIGS. 1 to 7.

Figure 1:
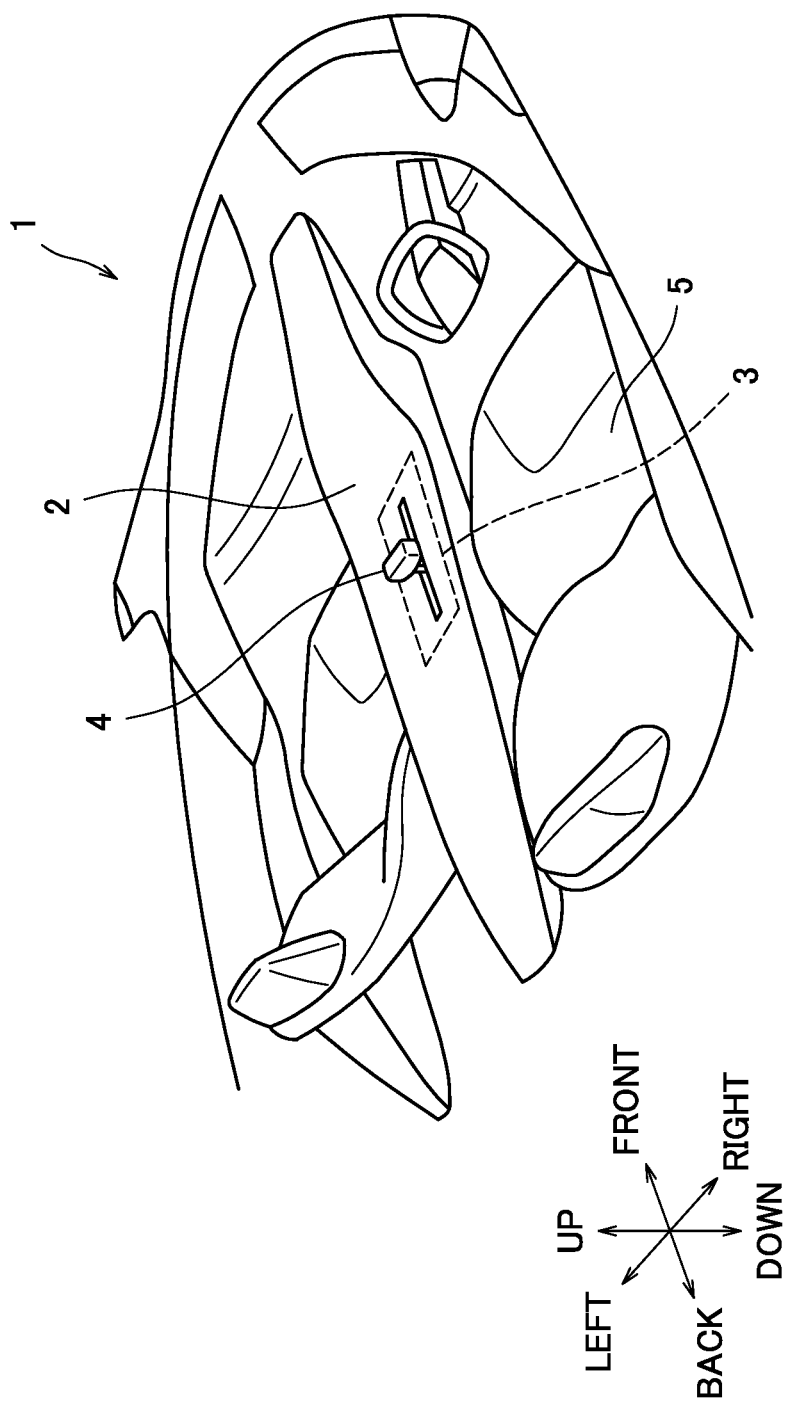
FIG. 1 is an image diagram illustrating a disposition example of an operation device for a vehicle automatic transmission in a vehicle.
Figure 2:
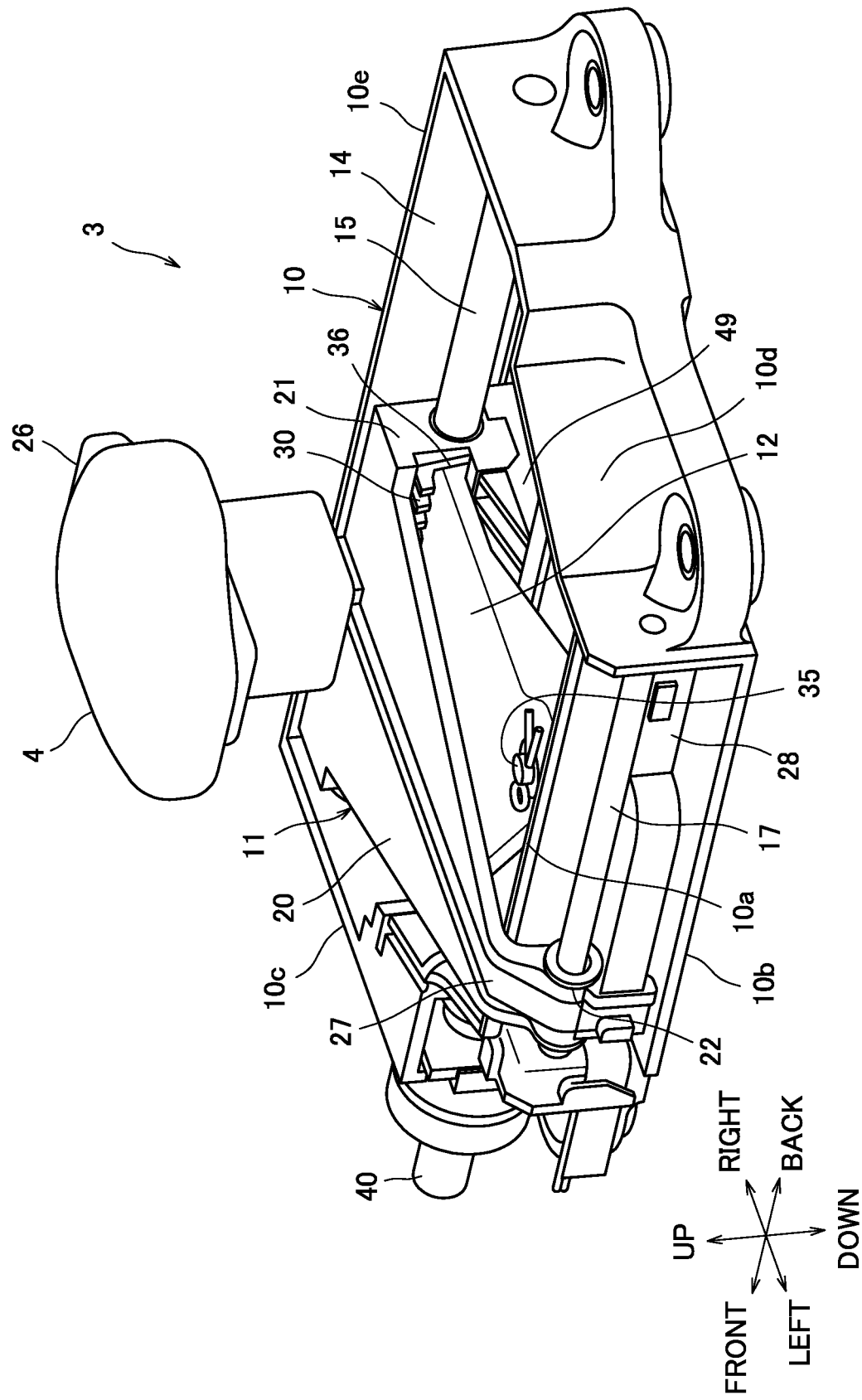
FIG. 2 is a perspective view illustrating a structure of an operation device for a vehicle automatic transmission according to a first embodiment of the present disclosure.
Figure 3:
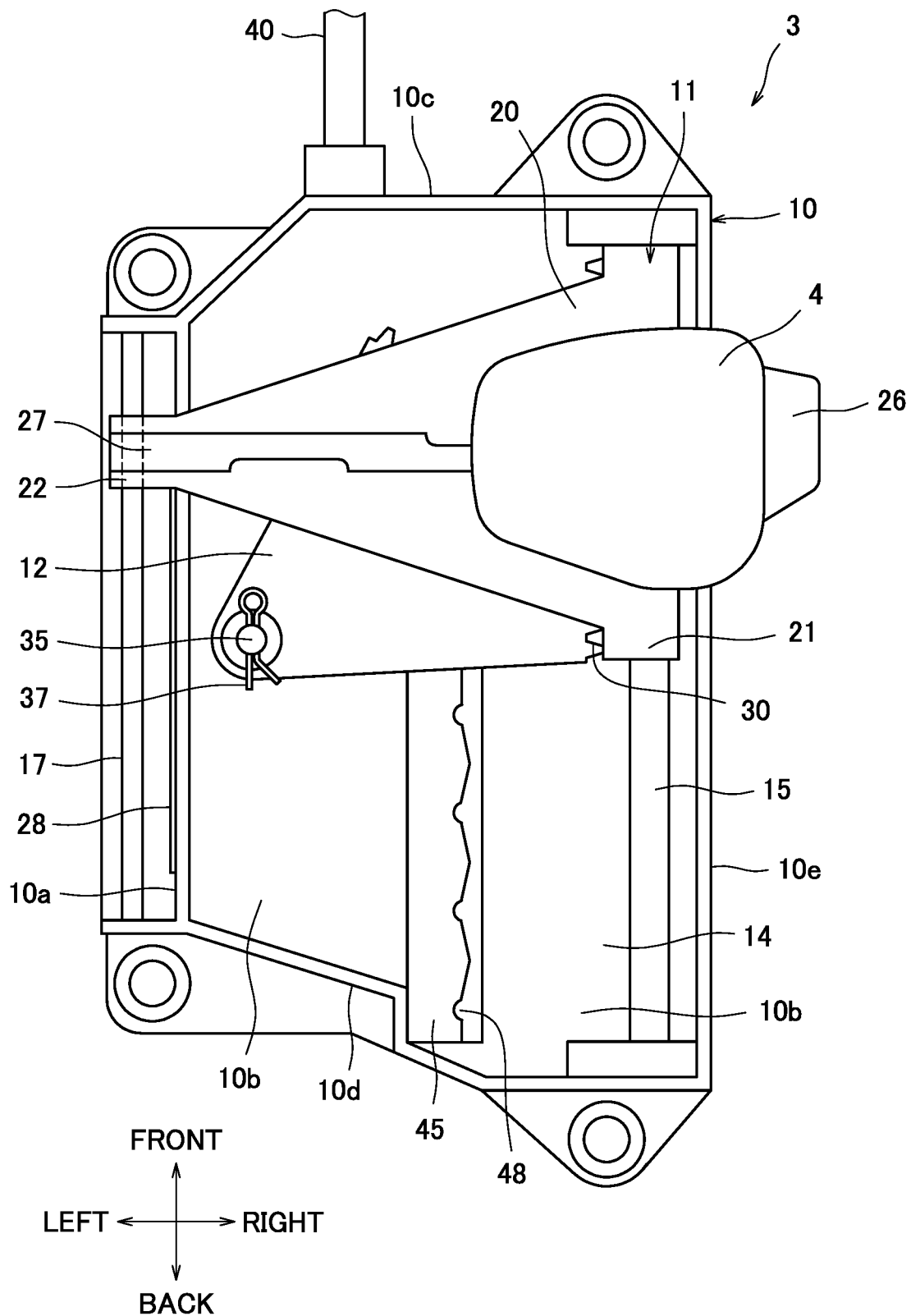
FIG. 3 is a top view of the operation device according to the first embodiment.
Figure 4:
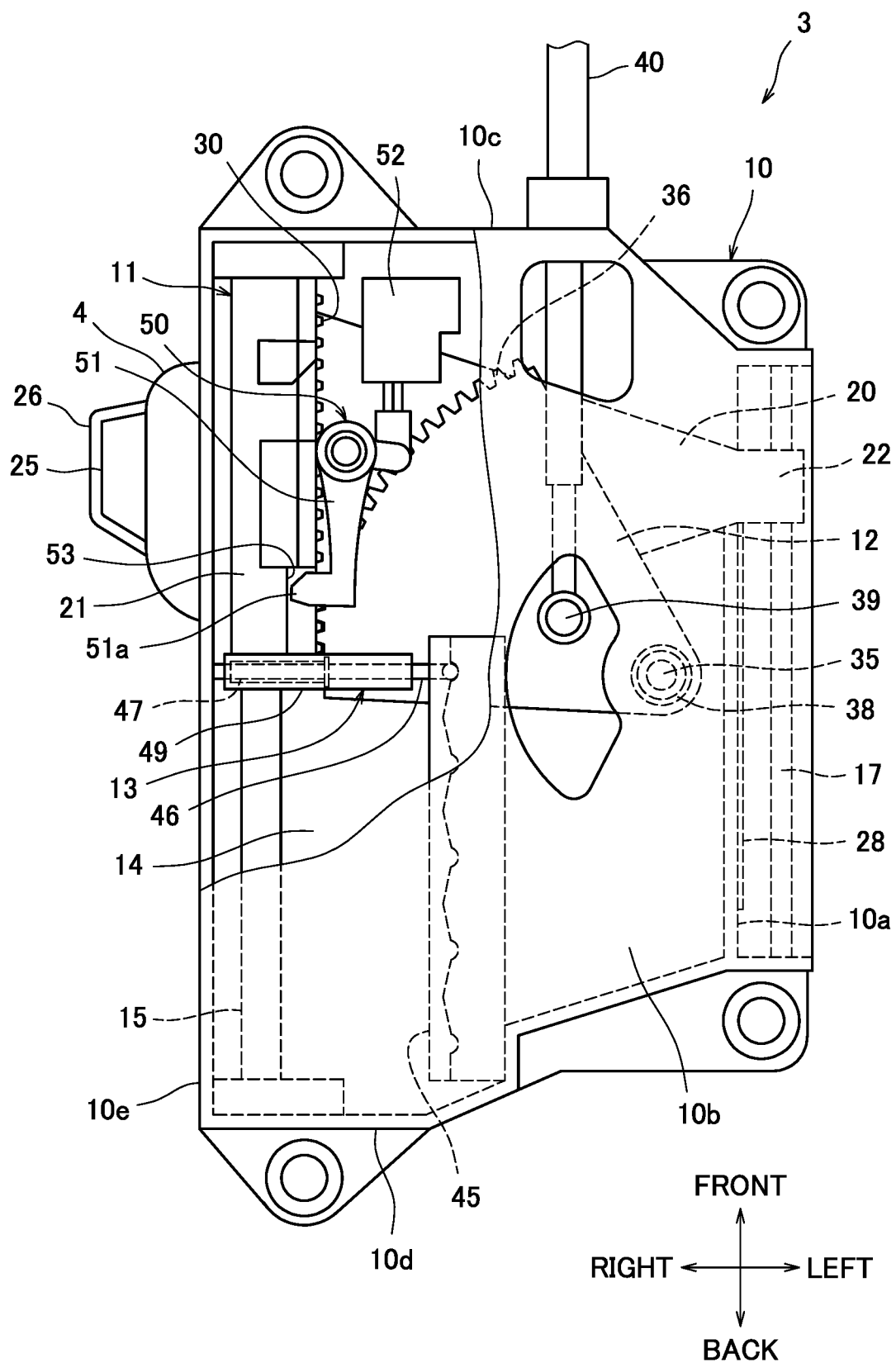
FIG. 4 is a bottom view illustrating an internal structure of the operation device according to the first embodiment.
Figure 6:
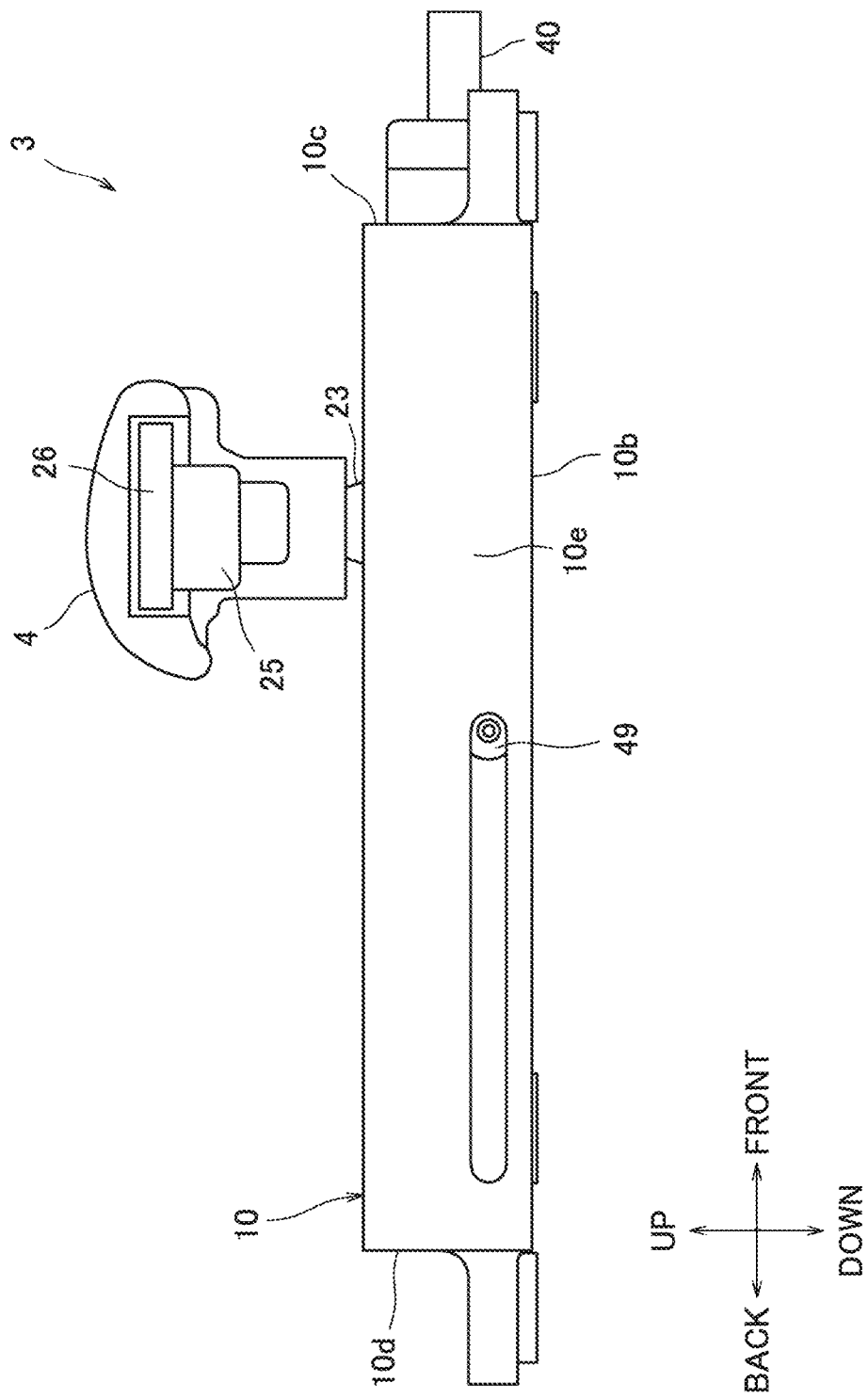
FIG. 6 is a right side view of the operation device according to the first embodiment.
Figure 7:
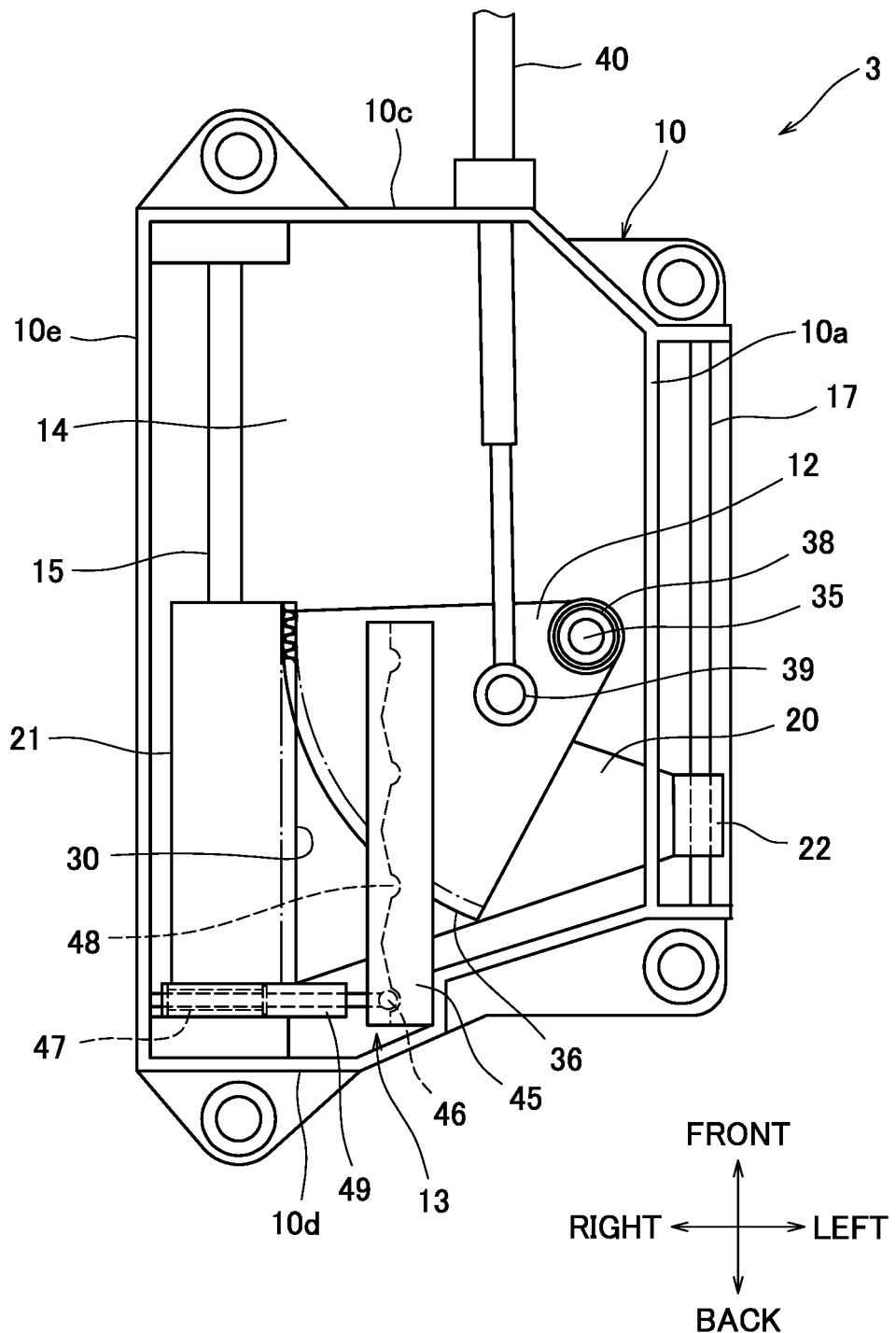
FIG. 7 is a bottom view of the operation device according to the first embodiment in a case in which a shift knob has been moved backward.

FIG. 1 is an image diagram illustrating a disposition example of an operation device 3 for a vehicle automatic transmission according to an embodiment of the present disclosure. FIG. 2 is a perspective view illustrating a structure of the operation device 3 according to the first embodiment of the present disclosure. FIG. 3 is a top view of the operation device 3, FIG. 4 is a bottom view illustrating an internal structure of the operation device 3, FIG. 5 is a back view of the operation device 3, and FIG. 6 is a right side view of the operation device 3. FIG. 7 is a bottom view of the operation device 3 in a case in which a shift knob 4 has moved to the vehicle back side. Note that FIG. 3 illustrates a right front portion of a bottom wall 10b of a base bracket 10 (bracket), which will be described later, in a partially opening manner. Also, illustration of the shift knob 4, the bottom wall 10b, and a shift locking mechanism portion 50 are omitted in FIG. 7.

As illustrated in FIGS. 1 and 2, the operation device 3 according to the first embodiment of the present disclosure includes the shift knob 4 adapted to be operated by a driver of the vehicle 1 in order to select a shift position of the vehicle automatic transmission.

The operation device 3 has the upper surface disposed at the substantially horizontal center console 2 on a side of a driver seat 5 of the vehicle 1. The operation device 3 is fixed to a vehicle body inside the center console 2 and is disposed such that the shift knob 4 projects upward from the upper surface of the center console 2.

As illustrated in FIGS. 2 to 6, the operation device 3 includes the base bracket 10, a slider lever 11 (sliding portion), a main gear 12 (gear), a detent mechanism portion 13, and the shift locking mechanism portion 50. The base bracket 10 and the slider lever 11 are formed of aluminum with relatively high strength, for example.

The base bracket 10 is a rectangular box-shaped member with an opening upper portion and with a thin thickness in the up-down direction. A left side wall 10a of the base bracket 10 is located on the right side (inner side) at about 1 to 2 cm from left ends of the bottom wall 10b, a front side wall 10c, and a back side wall 10d, and an upper end thereof is located below upper ends of the front side wall 10c and the back side wall 10d by several mm.

A main shaft 15 (first shaft) extending in the front-back direction at an up-down direction intermediate portion of an internal space 14 of the base bracket 10 along a right side wall 10e is included in the vicinity of the inside of the right side wall 10e of the base bracket 10. Also, a sub-shaft 17 (second shaft) extending in the front-back direction at an up-down direction intermediate portion of the base bracket 10 is included in parallel with the main shaft 15 along the left side wall 10a of the base bracket 10 in the vicinity of the outside (left side) of the left side wall 10a of the base bracket 10. Each of front end portions of the main shaft 15 and the sub-shaft 17 is fixed to the front side wall 10c of the base bracket 10, and each of back end portions of the main shaft 15 and the sub-shaft 17 is fixed to the back side wall 10d of the base bracket 10.

The slider lever 11 includes a sliding portion 20 that is a plate member with a substantially isosceles triangular shape including the right portion as a bottom side, a first boss portion 21 into which the main shaft 15 is inserted, and a second boss portion 22 into which the sub-shaft 17 is inserted.

The first boss portion 21 is formed to have a length of about ½ the front-back direction length of the internal space 14 of the base bracket 10, for example, and is disposed at the right end portion of the sliding portion 20. The second boss portion 22 is disposed at the left end portion of the sliding portion 20. An upper surface of the sliding portion 20 is disposed slightly below the upper end of the base bracket 10. Therefore, the sliding portion 20 of the slider lever 11 is disposed at an upper portion of the internal space 14 of the base bracket 10, has the right portion supported by the main shaft 15, has the left portion extending leftward beyond the upper portion of the left side wall 10a of the base bracket 10 and supported by the sub-shaft 17, and is disposed to be movable in the front-back direction along the main shaft 15 and the sub-shaft 17.

A pin 23 extending upward is provided at an upper surface of the right portion of the sliding portion 20, and the shift knob 4 is inserted into and fixed to the pin 23.

Note that a push button 25 for releasing lever lock and a selection plate 26 incorporating a display lamp, for example, for displaying the selected shift position are included on the right side surface of the shift knob 4. A flexible board (wiring) 27 that inputs and outputs operation and display control signals to the push button 25 and the selection plate 26 is included in the upper surface of the sliding portion 20. The flexible board 27 extends leftward in the upper surface of the sliding portion 20 from the shift knob 4, projects backward from the left end portion of the sliding portion 20, is bent in front of the back side wall 10d of the base bracket 10, and is connected to the outside via a print board 28 fixed to the outside of the left side wall 10a of the base bracket 10.

A rack gear 30 is included in a left side surface of the first boss portion 21 of the slider lever 11. Also, a back end portion of the first boss portion 21 includes a tubular plunger support portion 49 that extends leftward from the first boss portion 21 and supports a detent plunger 46 (plunger), which will be described later. A plunger support portion 49 has a hole with a diameter of several mm opening on the left side.

The main gear 12 is a spur gear formed into a fan plate shape and is disposed in the internal space 14 of the base bracket 10. The main gear 12 is rotatably supported by a gear support shaft 35 (rotational support shaft) with a center angle portion extending in the up-down direction. The gear support shaft 35 is included to extend upward from the bottom wall 10*b* at a position of the front-back direction center portion of the internal space 14 of the base bracket 10 near the left side wall 10*a*. The main gear 12 is disposed to be adjacent to a lower side of the lower surface of the sliding portion 20, has gear teeth 36 formed at the arc-shaped outer circumferential portion, and is configured as a pinion gear that is engaged with the rack gear 30 of the slider lever 11.

The gear teeth 36 of the main gear 12 and the rack gear 30 of the slider lever 11 have tooth surfaces formed into tapered shapes inclined in the left-right direction with respect to the up-down direction. Specifically, the tooth surfaces are inclined such that upper portions are located further leftward than the lower portions. Also, the main gear 12 is slightly movable in the up-down direction relative to the gear support shaft 35 although upward movement is restricted by a snap pin 37 inserted into the gear support shaft 35. The main gear 12 is configured to be biased upward relative to the base bracket 10 by a coil spring 38 (first biasing portion) included coaxially with the gear support shaft 35.

An end portion of the shift wire 40 connected to the transmission of the vehicle 1 is connected to the lower surface of the main gear 12 via a support pin 39 at a position separated from the insertion portion of the gear support shaft 35, that is, the support position of the main gear 12 in the radial direction of the main gear 12. The shift wire 40 extends forward from the location connected to the main gear 12 and extends forward through a hole portion included in the front side wall 10*c*, which is not illustrated.

The detent mechanism portion 13 is configured of a detent piece 45 included in the base bracket 10, a detent plunger 46 supported by the slider lever 11, and a shift spring 47 (second biasing portion).

The detent piece 45 is a rod-shaped member with a substantially L shape section in the left-right direction that is fixed to the bottom wall 10*b* of the base bracket 10 and extends in the front-back direction in parallel with the main shaft 15 at the left-right direction center portion of the internal space 14 of the base bracket 10. An irregular surface 48 (irregular portion) is formed on the right side surface of a portion of the detent piece 45 extending in the up-down direction.

The detent plunger 46 is a rod-shaped pin inserted into the plunger support portion 49 provided at the slider lever 11. The shift spring 47 is a coil-shaped spring inserted into the plunger support portion 49, for example. The detent plunger 46 is disposed to be pushed outward (leftward) by the shift spring 47 such that the distal end abuts the irregular surface 48 that is the right inner side surface of the detent piece 45.

The irregular surface 48 provided on the right inner side surface of the detent piece 45 has irregularity in the left-right direction, and a pressing force of the detent plunger 46 changes depending on the moving position of the slider lever 11 in the front-back direction. The irregular surface 48 is formed to obtain a click feeling by the detent plunger 46 abutting a recessed portion at a front-back position corresponding to each shift position of the slider lever 11. For example, in the present embodiment, the shift position becomes parking (P) in a case in which the slider lever 11 moves to the frontmost side as illustrated in FIG. 3, and the shift position becomes drive (D) in a case in which the slider lever 11 moves to the backmost side as illustrated in FIG. 7. Also, it is possible to select reverse (R) and neutral (N) in order from the front side between parking (P) and drive (D).

The shift locking mechanism portion 50 is configured of a shift lock stopper 51 and a shift lock solenoid 52.

The shift lock stopper 51 is a key-shaped bracket, is included in the internal space 14 of the base bracket 10, and is disposed below the main gear 12. A front end portion of the shift lock stopper 51 is rotatably supported by the bottom wall 10*b* of the base bracket 10, extends backward along the main shaft 15, and includes a key portion 51*a* formed at a back end portion to be bent leftward.

The shift lock solenoid 52 is included in the internal space 14 of the base bracket 10 and has a function of causing the shift lock stopper 51 to swing.

The key portion 51*a* of the shift lock stopper 51 is configured to be moved in the left-right direction by the shift lock solenoid 52. A recessed portion 53 into which the key portion 51*a* is inserted is formed in the left side surface of the first boss portion 21 of the slider lever 11. Front-back movement of the slider lever 11 is restricted by the key portion 51*a* of the shift lock stopper 51 being inserted into the recessed portion 53. On the other hand, front-back movement of the slider lever 11 is allowed by the shift lock solenoid 52 causing the shift lock stopper 51 to swing, causing the key portion 51*a* to swing leftward, and separating the key portion 51*a* from the recessed portion 53. In this manner, it is possible to achieve switching between locking and releasing of the shift position through operations of the shift lock solenoid 52.

As described above, the operation device 3 for a vehicle transmission according to the first embodiment of the present disclosure includes: the base bracket 10 that is fixed to the vehicle body of the vehicle 1; the slider lever 11 that includes the shift knob 4; and the main gear 12 that is a spur gear to which the end portion of the shift wire 40 of the transmission is connected, and the slider lever 11 includes the rack gear 30 that is formed along the sliding direction (front-back direction) of the slider lever 11 and is engaged with the tooth surface of the main gear 12. The main gear 12 rotates and the shift wire 40 is pushed or pulled by the driver of the vehicle 1 gripping the shift knob 4 and sliding the slider lever 11, and gear change of the transmission can thus be achieved.

Since the slider lever 11 is slidably supported by the base bracket 10 in the present embodiment, the strength of the support structure for the slider lever 11 can be relatively high.

Also, since the slider lever 11 and the main gear 12 are separate structures, a structure in which a large force is unlikely to act on the main gear 12 even if the driver of the vehicle 1 applies a force in the left-right direction to the shift knob 4, for example, is achieved. It is thus possible to reduce the thickness while reducing the strength of the main gear 12. In this manner, it is possible to achieve downsizing while sufficiently securing the strength of the operation device 3.

Since the gear support shaft 35 that is a rotation shaft of the main gear 12 is a fan plate-shaped member disposed to extend in the up-down direction that is the direction orthogonal to the sliding direction of the slider lever 11, and the main gear 12 is disposed to extend in the left-right direction on a side of the first boss portion 21 that is a support portion of the slider lever 11, it is possible to reduce the thickness of the base bracket 10 in the up-down direction. It is thus possible to reduce a mounting space for the operation device 3 required on the lower side from the upper surface of the center console 2 in the case in which the operation device 3 is mounted on the upper surface of the center console 2 of the vehicle 1 that substantially horizontally extends. Therefore, it is possible to improve a vehicle mountability of the operation device 3.

Also, the structure in which the fan-shaped main gear 12 pulls the shift wire 40 is adapted, it is possible to easily change the amount of sliding of the slider lever 11, that is, the moving distance of the shift wire 40 relative to the amount of sliding of the shift knob 4 by setting the connecting location between the main gear 12 and the shift wire 40 at an arbitrarily changed position. In this manner, it is possible to improve applicability of the operation device 3 to various transmissions.

Moreover, since the slider lever 11 is supported by the base bracket 10 not only via the main shaft 15 but also via the sub-shaft 17 disposed to be separated from the main shaft 15, it is possible to receive a load to be received by the slider lever 11 by the main shaft 15 and the sub-shaft 17 in a dispersed manner when a force is applied to the shift knob 4. Therefore, it is possible to reduce a load to be received by the first boss portion 21 and the second boss portion 22, and the main shaft 15 and the sub-shaft 17 that are support portions thereof when a force is applied in the left-right direction, in particular, to the shift knob 4. It is possible to reduce the thicknesses of the components such as the slider lever 11 and the base bracket 10 and to reduce the weight and the cost by reducing the load acting on these components.

Also, since the sub-shaft 17 is disposed at a position separated leftward from the main shaft 15 with the main gear 12 sandwiched therebetween, it is possible to secure a long distance between the first boss portion 21 and the second boss portion 22 while reducing the left-right dimension of the base bracket 10. Moreover, since the slider lever 11 is configured by the first boss portion 21 into which the main shaft 15 is inserted and the second boss portion 22 into which the sub-shaft 17 is inserted being connected to each other with the flat plate-shaped sliding portion 20 disposed to bridge the upper portion of the plate-shaped main gear 12, it is possible to reduce the up-down dimension of the base bracket 10 accommodating the slider lever 11 and the main gear 12.

Also, since the gear teeth 36 of the main gear 12 and the rack gear 30 have tooth surfaces inclined in the up-down direction and formed into the tapered shapes and are configured such that the main gear 12 is biased upward by the coil spring 38 and the gear teeth 36 of the main gear 12 and the rack gear 30 are pushed against each other, it is possible to reduce backlash of the main gear 12 and the rack gear 30. In this manner, it is possible to reduce rattling between the main gear 12 and the rack gear 30, to achieve a smooth operation of the main gear 12, to enable an accurate shift operation, and to improve operability.

Furthermore, since the detent mechanism portion 13 is included, and the detent plunger 46 provided at the slider lever 11 moves while being pushed against the irregular surface 48 of the detent piece 45 provided at the base bracket 10 when the slider lever 11 is moved in the front-back direction, it is possible to obtain a click feeling at each shift position according to the present embodiment. The position of the slider lever 11 is thus easily adjusted to each shift position, and it is possible to improve operability of the shift operation. Additionally, since the detent plunger 46 is disposed in the internal space 14 of the base bracket 10 to be adjacent to the lower side of the main gear 12 and extend in the left-right direction, it is possible to reduce the up-down dimension of the base bracket 10.

Next, a second embodiment of the present disclosure will be described by using FIGS. 8 and 9.

Figure 8:
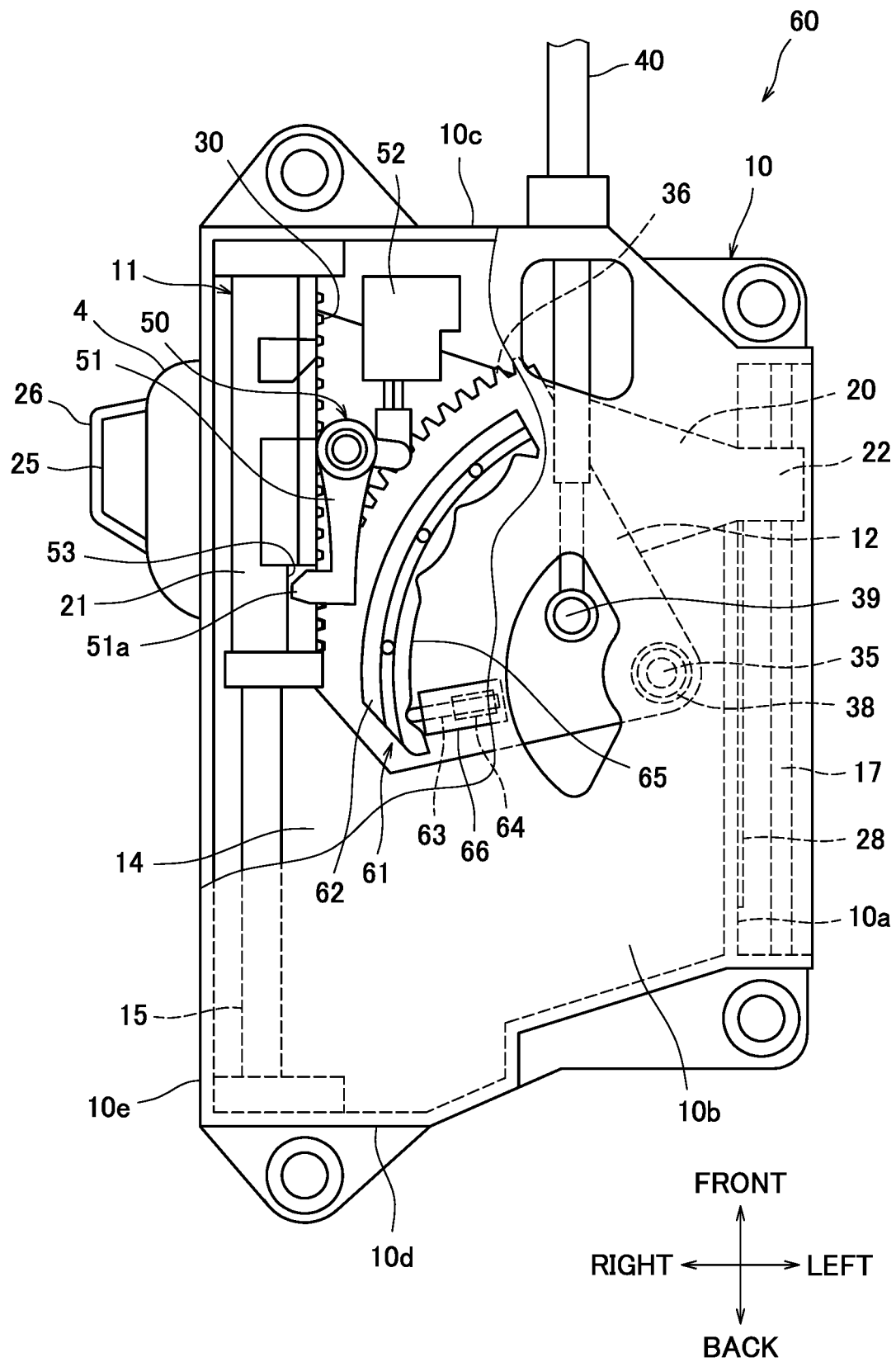
FIG. 8 is a bottom view illustrating an internal structure of an operation device according to a second embodiment of the present disclosure.
Figure 9:
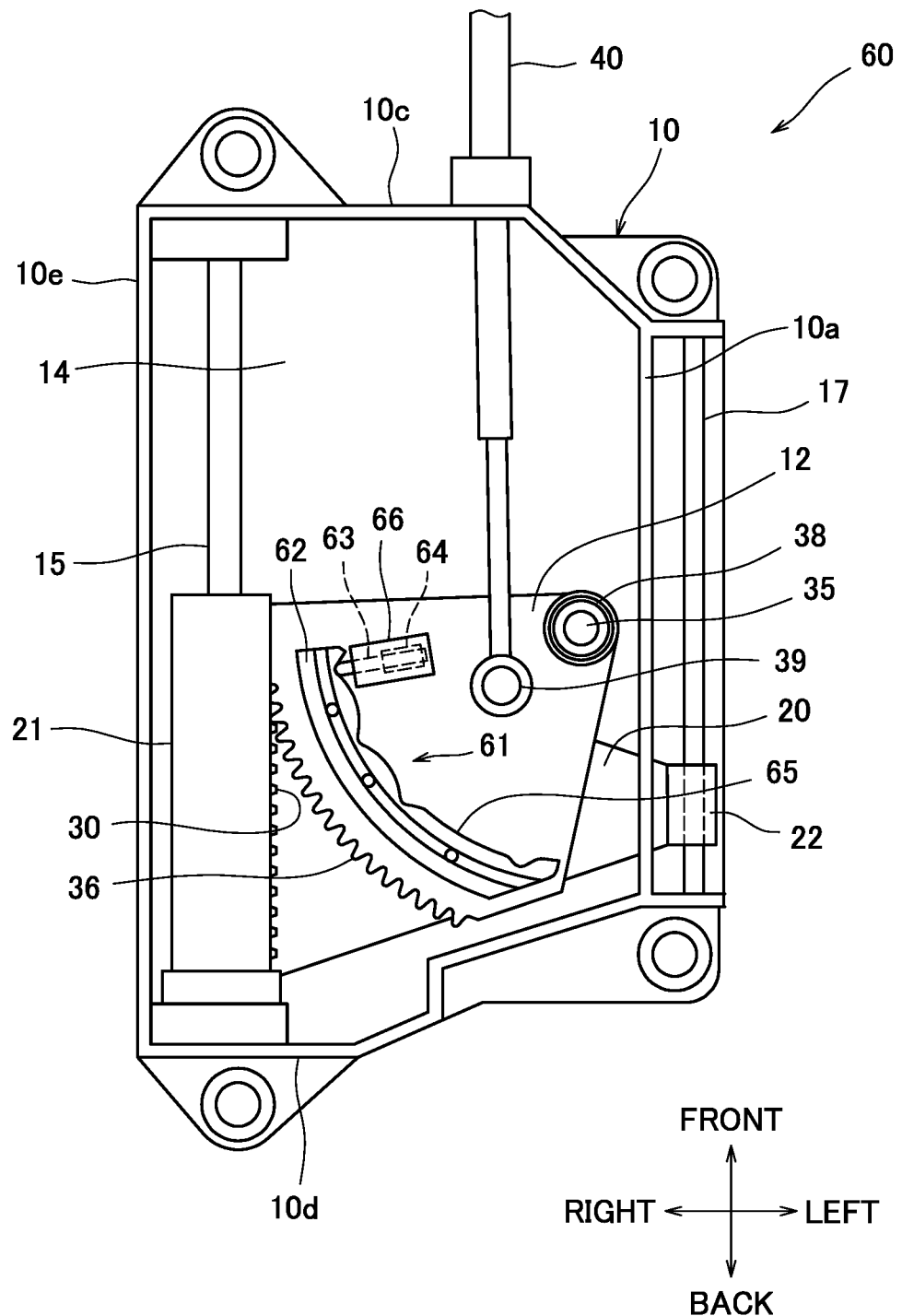
FIG. 9 is a bottom view of the operation device according to the second embodiment in a case in which a shift knob has been moved backward.

FIG. 8 is a bottom view illustrating an internal structure of an operation device 60 according to the second embodiment of the present disclosure. FIG. 9 is a bottom view of the operation device 60 in a case in which a shift knob 4 has been moved to the vehicle back side.

The operation device 60 according to the second embodiment is different from the operation device 3 according to the first embodiment in a structure of a detent mechanism portion 61 that applies a click feeling when a slider lever 11 moves. Hereinafter, differences from the operation device 3 according to the first embodiment will be described.

The detent mechanism portion 61 in the operation device 60 according to the second embodiment is configured of a detent piece 62 included in a main gear 12, a detent plunger 63 (plunger) supported by a base bracket 10, and a shift spring 64 (second biasing portion).

The detent piece 62 is fixed to the lower surface of the main gear 12 and is disposed on a side closer to a gear support shaft 35 than gear teeth 36 provided at an outer circumferential portion of the main gear 12. The detent piece 62 is formed into an arc shape around the gear support shaft 35 and has a substantially rectangular section in the radial direction. An irregular surface 65 (irregular portion) that is irregular in the radial direction is formed on the side surface of the detent piece 62 with the arc shape on the side of the gear support shaft 35.

The detent plunger 63 and the shift spring 64 are supported by a tubular plunger support portion 66 fixed to the base bracket 10. The detent plunger 63 is disposed to be pushed outward (substantially rightward) in the radial direction of the main gear 12 by the shift spring 64 such that the distal end abuts the irregular surface 65 of the detent piece 62.

The detent mechanism portion 61 according to the second embodiment is adapted such that the pressing force of the detent plunger 63 changes in accordance with the rotation position of the main gear 12. The irregular surface 65 is formed to obtain a click feeling by the detent plunger 63 abutting a recessed portion of the irregular surface 65 at a front-back position corresponding to each shift position of the slider lever 11.

Incidentally, since a reaction force of the pressing force of the detent plunger 46 acts rightward on the slider lever 11, that is, a force acts in a direction orthogonal to the sliding direction of the slider lever 11 in the detent mechanism portion 13 according to the first embodiment, a sliding resistance occurs when the slider lever 11 is moved in the front-back direction.

On the other hand, since the detent plunger 63 is included in the main gear 12, and the detent plunger 63 and the shift spring 64 are supported by the base bracket 10 in the detent mechanism portion 61 according to the second embodiment, the main gear 12 receiving the pressing force of the detent plunger 63 is supported by the gear support shaft 35, and the reaction force of the pressing force of the detent plunger 63 supports the base bracket 10. Therefore, the pressing force of the detent plunger 63 and the reaction force thereof do not act directly on the slider lever 11. Thus, according to the operation device 60 of the second embodiment, it is possible to reduce the sliding resistance of the slider lever 11 as compared with the operation device 3 according to the first embodiment and to further improve operability of the shift operation.

Also, according to the operation device 60 of the second embodiment, it is possible to reduce backlash between the main gear 12 and the rack gear 30 by the detent plunger 63 in the detent mechanism portion 61 pushing the main gear 12 substantially rightward, that is, toward the slider lever 11. It is thus possible to reduce rattling between the main gear 12 and the rack gear 30, to reduce an operation load (sliding load) of the shift knob 4, and to reduce rattling at the shift knob 4.

On the other hand, according to the operation device 3 of the first embodiment, the slider lever 11 is biased in a direction separated from the main gear 12 through pushing of the detent plunger 46 in the detent mechanism portion 13. Therefore, according to the operation device 3 of the first embodiment, an operation load of the shift knob 4 becomes larger than that of the operation device 60 according to the second embodiment and becomes suitable for the operation device that is desired to be operated firmly (heavily) to some extent. Also, according to the operation device 3 of the first embodiment, rattling of the slider lever 11 is reduced through pushing of the detent plunger 46 in the detent mechanism portion 13, and rattling of the shift knob 4 can thus be reduced.

Next, a third embodiment of the present disclosure will be described by using FIGS. 10 and 11.

Figure 10:
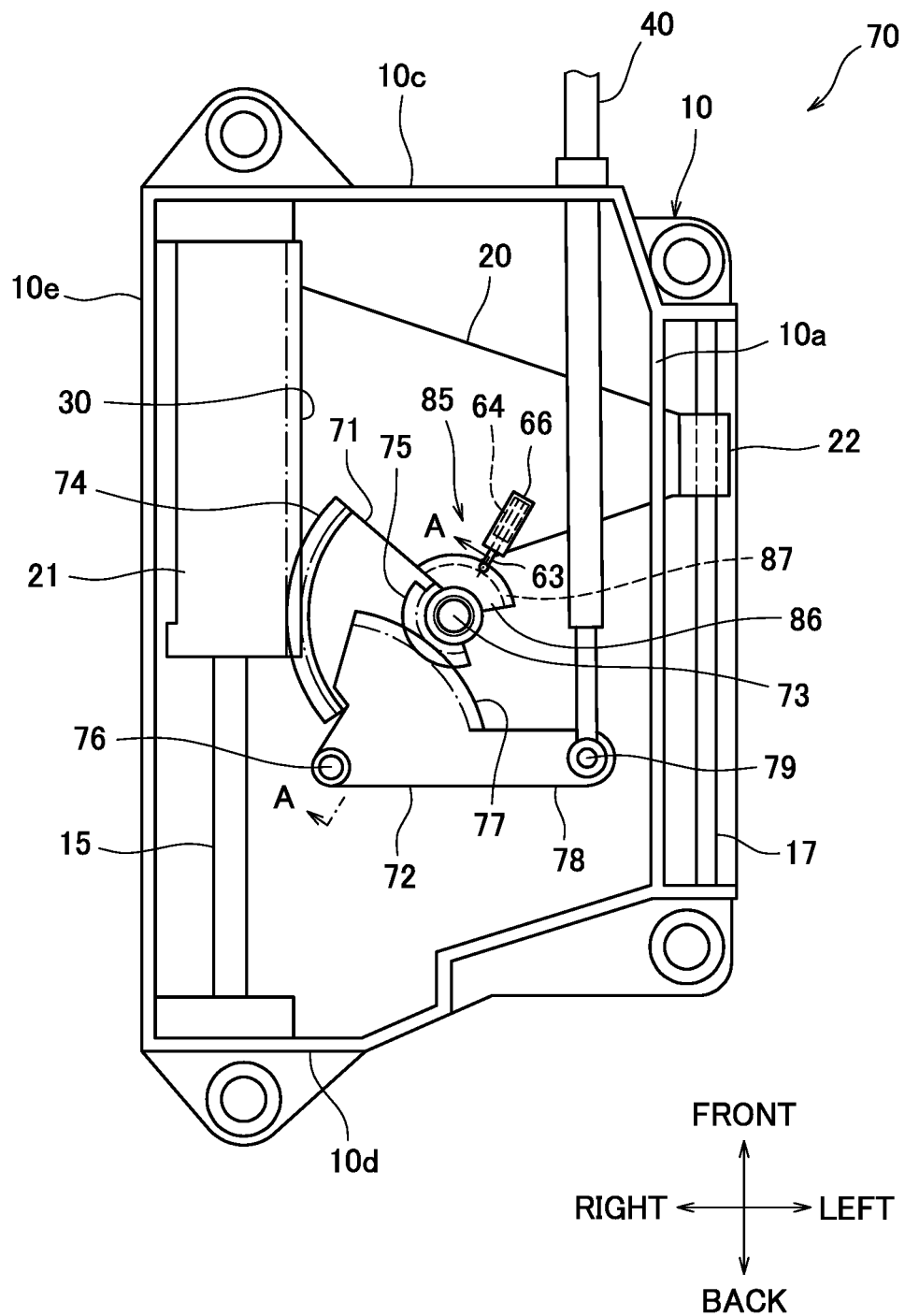
FIG. 10 is a bottom view illustrating an internal structure of an operation device according to a third embodiment of the present disclosure.

FIG. 10 is a bottom view illustrating an internal structure of an operation device 70 according to a third embodiment of the present disclosure. Note that FIG. 10 is a bottom view of the operation device 70 in a case in which a shift knob 4 in the operation device 70 has been moved on the vehicle front side, and illustration of a bottom wall 10b is omitted. FIG. 11 is a vertical sectional view near a gear support shaft 73 of a first gear 71 in the operation device 70. Note that FIG. 11 is a sectional view of the portion A-A illustrated in FIG. 10 (in FIG. 11, the upper side when the operation device 70 is fixed to the vehicle body is illustrated on the upper side of the paper surface, and the lower side is illustrated on the lower side of the paper surface).

Although an end portion of the shift wire 40 is connected to the main gear 12 via the support pin 39 in the first embodiment and the second embodiment described above, a second gear 72 is attached in an interposed manner between a first gear 71 corresponding to the main gear 12 and an end portion of a shift wire 40 as illustrated in FIG. 10 in the operation device 70 according to the third embodiment.

The first gear 71 has a fan shape similarly to the main gear 12, is rotatably supported by a base bracket 10 via a gear support shaft 73 extending in the up-down direction, and includes first gear teeth 74 (first tooth surface) that are engaged with a rack gear 30 at an outer circumferential portion. The first gear 71 further includes second gear teeth 75 (second tooth surface) aligned in the circumferential direction at positions that are different from those of the first gear teeth 74 in the radial direction.

The second gear 72 is disposed to be adjacent to the back side of the first gear 71 and is rotatably supported by the base bracket 10 via a gear support shaft 76 extending in the up-down direction. The gear support shaft 76 is disposed on the right back side relative to the gear support shaft 73 of the first gear 71. The second gear 72 includes third gear teeth 77 (third tooth surface) that are engaged with the second gear teeth 75 and includes an extension portion 78 extending leftward from the support position of the gear support shaft 76. An end portion of the shift wire 40 is supported by a distal end portion of the extension portion 78 via a support pin 79. The support pin 79 is located further leftward than the gear support shaft 73 of the first gear 71.

In this manner, according to the operation device 70 of the third embodiment, the two sets of gears (the rack gear 30 and the first gear teeth 74, and the second gear teeth 75 and the third gear teeth 77) are interposed between the first boss portion 21 to which the shift knob 4 is fixed and the end portion of the shift wire 40. Therefore, it is possible to appropriately set the moving distance (the amount of operation of the shift wire 40) of the end portion of the shift wire 40 in the front-back direction with respect to the sliding distance (the amount of operation of the shift knob 4) of the shift knob 4 in the front-back direction and an operation load of the shift knob 4 by appropriately setting a deceleration ratio between these two sets of gears. Particularly, it is possible to set a small amount of operation of the shift knob 4 after securing a necessary amount of operation of the shift wire 40 while reducing an operation load of the shift knob 4 to be small, by extending the extension portion 78 to be long on the left side and setting the distance between the gear support shaft 76 of the second gear 72 and the support position of the shift wire 40 to be long.

Also, as illustrated in FIG. 11, the first gear 71 is configured to be biased downward relative to the base bracket 10 by the coil spring 80 (first biasing portion) included coaxially with the gear support shaft 73. Moreover, the second gear teeth 75 and the third gear teeth 77 have tapered shapes slightly inclined inward in the radial direction toward the lower side.

Therefore, the second gear teeth 75 and the third gear teeth 77 approaches each other, and backlash is reduced, by the coil spring 80 biasing the first gear 71 downward.

Also, a detent mechanism portion 85 of the operation device 70 is configured of a detent piece 86 included in the first gear 71, a detent plunger 63 (plunger) supported by the base bracket 10, and a shift spring 64 (second biasing portion).

The detent piece 86 is included on the front side of the gear support shaft 73 of the first gear 71 and has a wall surface 87 formed into an arc shape around the gear support shaft 73 with a width of about 1 cm in the up-down direction, for example. The wall surface 87 is inclined outward in the radial direction toward the lower side.

The detent plunger 63 and the shift spring 64 are supported by a tubular plunger support portion 66 fixed to the base bracket 10. The plunger support portion 66 is located on the left front side of the gear support shaft 73 and is disposed such that the distal end of the detent plunger 63 abuts the wall surface 87 of the detent piece 86. The plunger support portion 66 is disposed with an axial line inclined such that the detent plunger 63 is pushed toward the gear support shaft 76 on the right back side and toward an obliquely upper side by the shift spring 64.

Therefore, it is possible to reduce rattling of the first gear 71 by pushing the first gear 71 against the gear support shaft 73 with a biasing force of the detent plunger 63 in the detent mechanism portion 85. Moreover, the first gear 71 is also biased downward by the detent plunger 63 abutting the inclined wall surface 87. It is thus possible to further reduce backlash by causing the inclined second gear teeth 75 and the third gear teeth 77 to further approach each other.

According to the third embodiment, the first boss portion 21 is not biased by the detent mechanism portion 85, and it is thus possible to reduce a sliding resistance during sliding of the first boss portion 21 and to reduce an operation force of the shift knob 4. Also, it is possible to reduce backlash between the second gear teeth 75 and the third gear teeth 77 with the coil spring 80 and the detent mechanism portion 85, to reduce rattling of the first gear 71, and to improve operability of the shift knob 4.

Note that the wall surface 87 of the detent piece 86 may be configured such that a recessed portion is provided at a position which the distal end of the detent plunger 63 abuts and a click feeling is applied when the shift knob 4 is slid, or a structure in which the wall surface 87 is formed to be flat to apply a click feeling to another location may be provided.

Although the description of the embodiments will now be ended, the present disclosure is not limited to the aforementioned embodiments. For example, although the operation device 3 is mounted on the substantially horizontal surface of the center console 2 of the vehicle 1 in the aforementioned embodiments, the operation device 3 may be mounted on a mounting surface of the vehicle 1 directed in another direction. In a case in which the operation device 3 is mounted in a mounting surface directed in the left direction, the right direction, or the back direction of the vehicle and extending in the up-down direction, for example, it is possible to save the space for attaching the operation device 3 in a further direction of the mounting surface. Particularly, it is possible to save the mounting space of the operation device 3 in the vehicle left-right direction by mounting the operation device 3 in the mounting surface directed in the left direction or the right direction of the vehicle.

Also, detailed structures of various components can be appropriately changed. For example, in order to avoid an interference with other components, the shape of the main gear 12 may be a shape other than the fan shape, such as a T shape or an inverted L shape. Also, the present disclosure can be widely applied to operation devices for transmissions of various vehicles.

EXPLANATION OF REFERENCE SIGNS

1 Vehicle
3, 60, 70 Operation device
4 Shift knob
10 Base bracket (bracket)
11 Slider lever (sliding portion)
12 Main gear (gear)
15 Main shaft (first shaft)
17 Sub-shaft (second shaft)
21 First boss portion
22 Second boss portion
30 Rack gear
35 Gear support shaft (rotational support shaft)
36 Gear teeth (tooth surface)
38 Coil spring (first biasing portion)
40 Shift wire
45, 62, 86 Detent piece
46, 63 Detent plunger (plunger)
47, 64 Shift spring (second biasing portion)
48, 65 Irregular surface (irregular portion)
71 First gear
72 Second gear
74 First gear teeth (first tooth surface)
75 Second gear teeth (second tooth surface)
77 Third gear teeth (third tooth surface)

The invention claimed is:

1. An operation device for a vehicle transmission comprising:
   a bracket that is fixed to a vehicle body of a vehicle;
   a sliding portion that is slidably supported by the bracket and includes a shift knob;
   a first gear that is rotatably supported by the bracket, includes a first tooth surface at an outer circumferential portion, and includes a second tooth surface at a position that is different from a position of the first tooth surface in a radial direction;
   a second gear, which is rotatably supported by the bracket and includes a third tooth surface that is engaged with the second tooth surface, to which a shift wire of the vehicle transmission is connected at a position separated from a position where the second gear is supported by the bracket; and
   a first shaft and a second shaft extending in parallel with each other at positions with the first and second gears sandwiched therebetween,
   wherein the sliding portion includes a first boss portion into which the first shaft is inserted and a second boss portion into which the second shaft is inserted and is configured with the first boss portion and the second boss portion being connected beyond the first and second gears; and
   wherein the sliding portion includes a rack gear that is formed along a sliding direction of the sliding portion and is engaged with the first tooth surface of the first gear, and gear change of the vehicle transmission is performed via the shift wire by causing the first gear and the second gear to rotate with sliding of the sliding portion.

2. A vehicle comprising:
   the operation device for a vehicle transmission according to claim 1.

3. The operation device for a vehicle transmission according to claim 1, wherein:
   the second tooth surface of the first gear and the third tooth surface of the second gear are formed into tapered shapes; and
   the operation device further comprises a first biasing portion that biases the first gear in an axial line direction of a rotational support shaft of the first gear and pushes the second tooth surface of the first gear against the third tooth surface of the second gear.

4. The operation device for a vehicle transmission according to claim 3, further comprising:
   a detent piece that is included in the first gear;
   a plunger that is supported by the bracket; and
   a second biasing portion that biases the plunger, pushes the plunger against the detent piece, and biases the first gear toward a support shaft of the first gear.

\* \* \* \* \*